United States Patent
Yang et al.

(10) Patent No.: US 11,791,666 B2
(45) Date of Patent: Oct. 17, 2023

(54) FOREIGN OBJECT DETECTION CIRCUIT AND FOREIGN OBJECT DETECTION METHOD

(71) Applicant: NuVolta Technologies (Hefei) Co., Ltd., Hefei (CN)

(72) Inventors: Min Yang, Shanghai (CN); Bingtao Yu, Shanghai (CN)

(73) Assignee: NuVolta Technologies (Hefei) Co., Ltd., Hefei (CN)

(*) Notice: Subject to any disclaimer, the term of this patent is extended or adjusted under 35 U.S.C. 154(b) by 0 days.

(21) Appl. No.: 18/046,554

(22) Filed: Oct. 14, 2022

(65) Prior Publication Data

US 2023/0121561 A1   Apr. 20, 2023

(30) Foreign Application Priority Data

Oct. 20, 2021 (CN) .......................... 202111225056.3

(51) Int. Cl.
*H02J 50/60* (2016.01)
*H02J 50/80* (2016.01)
*H02J 50/12* (2016.01)
*G01V 3/10* (2006.01)

(52) U.S. Cl.
CPC .............. *H02J 50/60* (2016.02); *G01V 3/102* (2013.01); *H02J 50/12* (2016.02); *H02J 50/80* (2016.02)

(58) Field of Classification Search
CPC ............ H02J 50/12; H02J 50/60; H02J 50/80
See application file for complete search history.

(56) References Cited

U.S. PATENT DOCUMENTS

| | | | |
|---|---|---|---|
| 2017/0117755 A1* | 4/2017 | Muratov | H02J 50/10 |
| 2017/0179772 A1* | 6/2017 | Asanuma | H02J 50/90 |
| 2021/0203193 A1* | 7/2021 | Kim | H02J 50/80 |
| 2022/0385117 A1* | 12/2022 | Moritomo | H04B 5/02 |

* cited by examiner

*Primary Examiner* — Rexford N Barnie
*Assistant Examiner* — Joseph N Inge
(74) *Attorney, Agent, or Firm* — AP3 Law Firm PLLC (57) ABSTRACT

The disclosure includes a foreign object detection circuit and a foreign object detection method. The method comprises: step a) establishing a communication link between a transmitter and a receiver in a wireless power transmission system; step b) performing, by the transmitter and the receiver, wireless power transmission based on the magnetic coupling; and step c) measuring a quality factor of a receiver terminal, and determining whether a foreign object exists in the wireless power transmission system or not based on the quality factor. In accordance with a foreign object detection circuit and a foreign object detection method provided by the present invention, the problem that the foreign object cannot be detected effectively in the prior art is solved.

20 Claims, 8 Drawing Sheets

FOREIGN OBJECT DETECTION CIRCUIT AND FOREIGN OBJECT DETECTION METHOD

PRIORITY CLAIM

This application claims priority to Chinese Patent Application No. 202111225056.3, filed on Oct. 20, 2021, which is hereby incorporated by reference in its entirety.

TECHNICAL FIELD

The present invention relates to the technical field of wireless power transmission, and in particular relates to a foreign object detection circuit and a foreign object detection method used in a wireless power transmission system.

BACKGROUND

With the development of technology, wireless power transmission has become an effective and convenient mechanism for providing power for mobile terminals (such as mobile phones, tablet computers, digital cameras, MP3 players and/or other similar terminals) or charging batteries. A wireless power transmission system typically includes a primary side transmitter and a secondary side receiver which are connected by means of magnetic coupling.

In the normal wireless power transmission system, energy transmission only occurs between the primary side transmitter and the secondary side receiver. However, in practical applications, as the wireless power transmission system is usually in an open scenario (e.g., a mobile phone with a wireless charging function is charged by a charger used as an accessory, and the mobile phone and the charger are in an independent and separable product form). Sometimes, foreign objects (such as coins, clips, keys or filters) may exist between the primary side transmitter and the secondary side receiver, while the foreign objects may also consume power from the magnetic field and heat themselves to an unsafe temperature level, which not only reduces the power transmission efficiency of the wireless power transmission system, but also threatens the personal safety of users.

To this end, it is necessary to provide a simple and reliable foreign object detection method for providing a rapid and accurate solution under various operating conditions.

SUMMARY

In view of the shortcomings of the prior art above, an objective of the present invention is to provide a foreign object detection circuit and a foreign object detection method for solving the problems above.

To achieve the objective above and other related objectives, the present invention provides a foreign object detection method used in a wireless power transmission system. The foreign object detection method comprises: step a) establishing a communication link between a transmitter and a receiver in a wireless power transmission system; step b) performing, by the transmitter and the receiver, wireless power transmission based on a magnetic coupling; and step c) measuring a quality factor of a receiver terminal, and determining whether a foreign object exists in the wireless power transmission system or not based on the quality factor.

Alternatively, the step c) is performed before and/or after the step b).

Alternatively, when the step c) is performed before the step b), the step c) further comprises: in a case of determining that no foreign object exits in the wireless power transmission system, enabling the wireless power transmission; and in a case of determining that the foreign object exists in the wireless power transmission system, not enabling, or limiting, the wireless power transmission.

Alternatively, when the step c) is performed after the step b), the step c) further comprises: in a case of determining that no foreign object exits in the wireless power transmission system, continuing the wireless power transmission; and in a case of determining that the foreign object exists in the wireless power transmission system, ending, or limiting, the wireless power transmission.

Alternatively, the wireless power transmission is limited by limiting the transmission power.

Alternatively, a method for measuring a quality factor of a receiver terminal comprises applying an excitation with a voltage step to a resonance circuit formed by a receiving coil and a resonant capacitor in the receiver, and enabling the resonance circuit to generate a self-excited oscillation so as to obtain a damped sinusoidal waveform with a resonance attenuation envelope, comparing the damped sinusoidal waveform with a threshold voltage, and detecting the last moment at which a value of the damped sinusoidal waveform is equal to the threshold voltage, determining the moment corresponding to the peak value of the damped sinusoidal waveform according to the last moment, wherein the moment corresponding to the peak value and the last moment are located in the same cycle of the damped sinusoidal waveform, determining the peak value of the damped sinusoidal waveform according to the last moment, the moment corresponding to the peak value and the threshold voltage, and calculating the quality factor according to the moment corresponding to the peak value and a ratio of a voltage value of the voltage step to the peak value.

Alternatively, a method for measuring a quality factor of a receiver terminal comprises applying an excitation with a voltage step to a resonance circuit formed by a receiving coil and a resonant capacitor in the receiver, and enabling the resonance circuit to generate self-excited oscillation, sampling a capacitor voltage in the resonance circuit to obtain a sampling voltage signal, performing peak value holding on the sampling voltage signal so as to output a peak voltage signal, and converting the sampling voltage signal into a square signal synchronously, performing an analog-to-digital conversion and sampling synchronously on the peak voltage signal and the square signal to obtain a peak voltage of each wave crest and a corresponding cycle number thereof, and calculating the quality factor according to a peak voltage of each wave crest and a corresponding cycle number thereof.

Alternatively, a method for determining whether a foreign object exists in the wireless power transmission system or not based on the quality factor comprises comparing the quality factor with a set value, determining that the foreign object exists in the wireless power transmission system when the quality factor is smaller than the set value, and determining that no foreign object exists in the wireless power transmission system when the quality factor is greater than the set value.

Alternatively, a method for obtaining the set value comprises when no foreign object exists, measuring the quality factors of the receiver terminal under different center distances, and selecting the minimum value as a set quality factor, using a product of the set quality factor and a set percent as the set value, wherein the center distance refers to a distance between the center of a transmitting coil of the transmitter and the center of a receiving coil of the receiver.

Alternatively, a plurality of sets of measurements are repeated to obtain a plurality of the minimum values, and a plurality of the minimum values are averaged to obtain the set quality factor.

Alternatively, the set percent is not greater than 100%.

The present invention further provides a foreign object detection circuit arranged in the receiver of the wireless power transmission system. The foreign object detection circuit comprises an excitation injection module and a foreign object detection module, as well as a resonance circuit coupled to the receiver in the wireless power transmission system, wherein the resonance circuit comprises a receiving coil and a resonant capacitor connected in series.

The excitation injection module is configured to apply an excitation with a voltage step to the resonance circuit, and to enable the resonance circuit to generate a self-excited oscillation.

The foreign object detection module is configured to measure a quality factor of a receiver terminal based on the self-excited oscillation of the resonance circuit and to determine whether a foreign object exists in the wireless power transmission system or not based on the quality factor.

Alternatively, the foreign object detection module is further configured to perform a foreign object detection time control, and to perform a transmission control according to whether the foreign object exists or not.

As above, in accordance with a foreign object detection circuit and a foreign object detection method provided by the present invention, before the power transmission process and/or in the power transmission process, the foreign object detection is performed by using a quality factor of a receiver terminal. The detection error is greatly reduced, and the detection precision is improved.

Reference numerals are as follows:
10 Power supply
20 Transmitter
201 Voltage conversion circuit
202 TX resonance circuit
203 TX communication circuit
204 TX control circuit
30 Receiver
301 RX resonance circuit
302 Rectifier circuit
303 RX communication circuit
304 RX control circuit
40 Load 50 Foreign object detection circuit
501 Excitation injection module
502 Foreign object detection module
502a Voltage sampling unit
502b Comparator
502c Peak value sampling and holding unit
502d ADC sampling and converting unit
502e Controller

DETAILED DESCRIPTION OF ILLUSTRATIVE EMBODIMENTS

The embodiments of the present invention are described below by way of specific examples, and additional advantages and efficacy of the present invention will be readily apparent to those skilled in the art from the contents disclosed in the present description. The present invention may be further implemented or applied through other different specific embodiments, and various modifications or changes may also be made to each of the details in the present description based on different perspectives and applications without departing from the spirit of the present invention.

Please refer to FIG. 1 to FIG. 8. It needs to be noted that the drawings provided in the embodiment only explain the basic conception of the present invention in an illustrative manner, so the drawings only display the components relevant to the present invention rather than being drawn according to the number, shape and size of the components during actual implementation. The shape, number and scale of each component may be randomly changed during its actual implementation, and the layout of the components thereof might also be more complicated.

Figure 1:
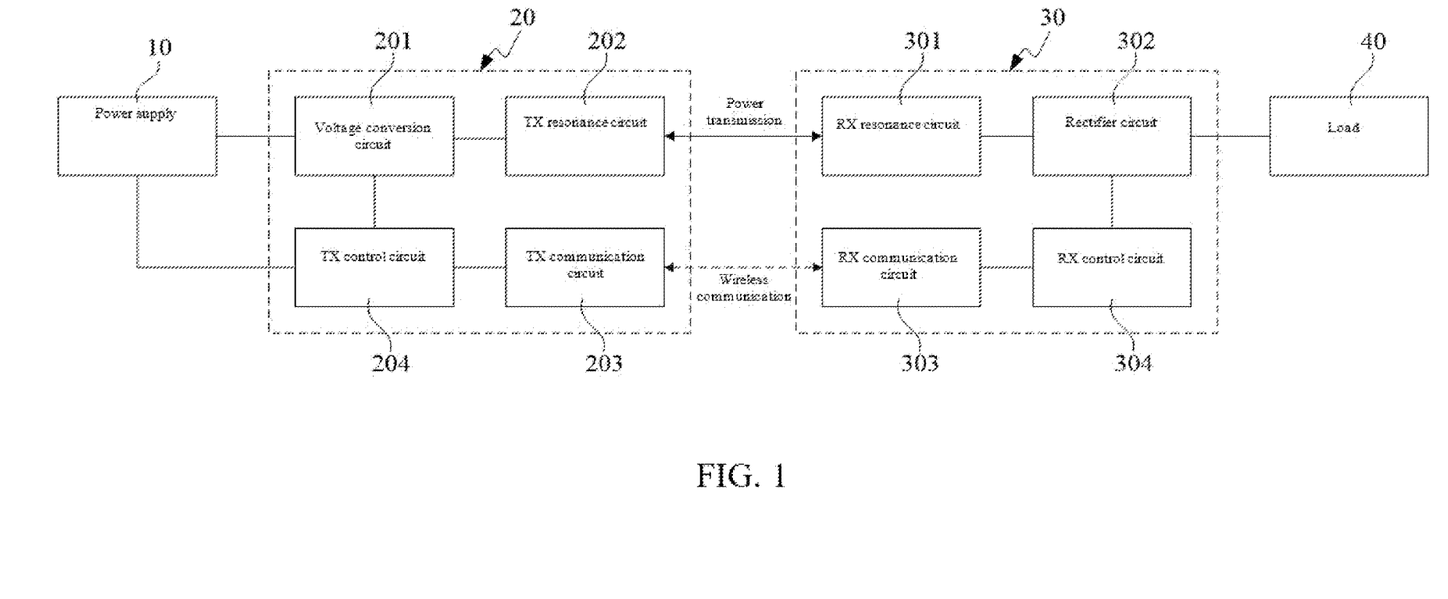
FIG. 1 shows a block diagram of a wireless power transmission system.

In accordance with the embodiment, the foreign object detection circuit and method are used in a wireless power transmission system. A block diagram of the wireless power transmission system is as shown in FIG. 1, including a transmitter 20 and a receiver 30 connected in cascade between a power supply 10 and a load 40. The transmitter 20 includes a voltage conversion circuit 201 and a TX resonance circuit 202. The receiver 30 includes a RX resonance circuit 301 and a rectifier circuit 302. The voltage conversion circuit 201 is coupled between the power supply 10 and the TX resonance circuit 202. The rectifier circuit 302 is coupled between the RX resonance circuit 301 and the load 40.

Figure 2:
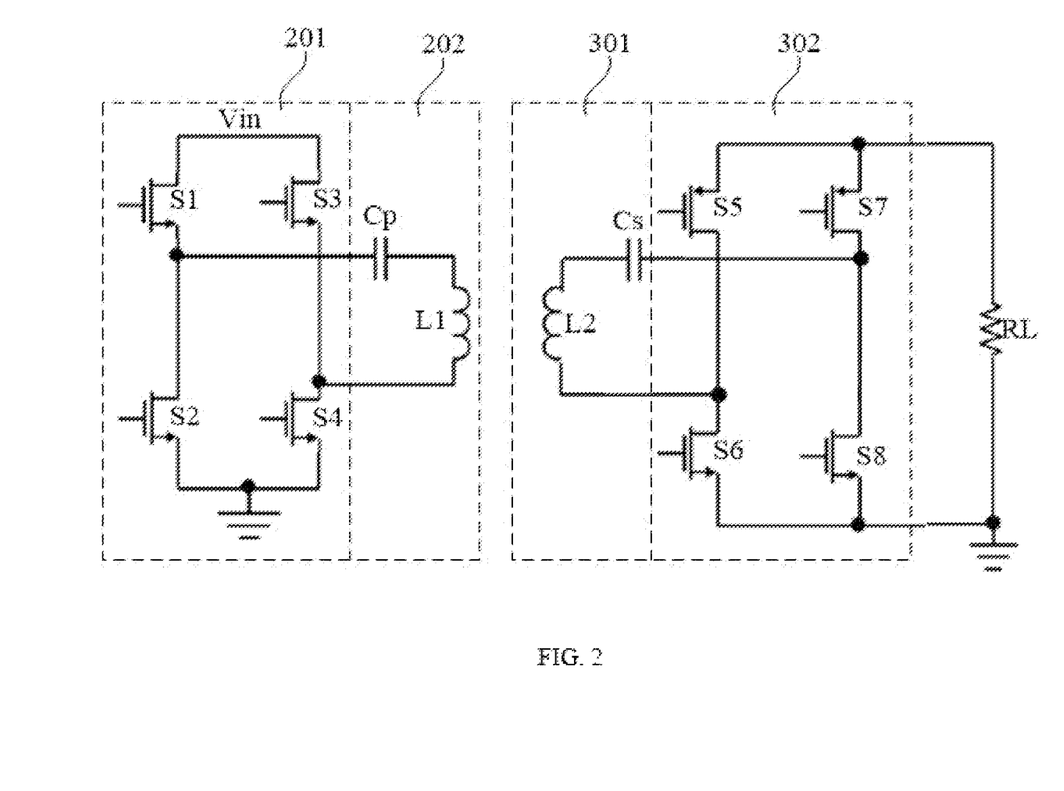
FIG. 2 shows a circuit diagram of a transmitter and a receiver part.

The power supply 10 may be a power adapter configured to convert 220 V AC utility power supply into DC (e.g., 5V, 10V and the like), a renewable power supply such as a solar panel, an energy storage apparatus such as a rechargeable battery, a fuel cell, and/or other types of energy storage devices. The voltage conversion circuit 201 is a DC-AC converter consisting of switches S1-S4, and is configured to convert DC output from the power supply 10 into AC. The TX resonance circuit 202 includes a resonant capacitor Cp and a transmitting coil L1 connected in series, and is configured to generate an alternating magnetic field after receiving the AC output by the voltage conversion circuit 201 (as shown in FIG. 2). The RX resonance circuit 301 includes a resonant capacitor Cs and a receiving coil L2 connected in series, and is configured to receive the alternating magnetic field generated by the TX resonance circuit 202 and output AC. The rectifier circuit 302 is a synchronous rectifier comprising switches S5-S8, and is configured to rectify the AC output by the RX resonance circuit 301 and output the rectified AC (as shown in FIG. 2). The load 40 may be a power consumption apparatus, a rechargeable battery and/or a plurality of rechargeable batteries connected in series or in parallel. Alternatively, the switches S1-S4 are N-type switches. The switches S5 and S7 are P-type switches. The switches S6 and S8 are N-type switches. It needs to be noted that the switches S5 and S7 may also be N-type switches, the switches S6 and S8 may also be P-type switches, which has no impact on this embodiment.

In addition, to control the wireless power transmission process, the transmitter 20 further includes a TX communication circuit 203 and a TX control circuit 204. The receiver 30 further includes a RX communication circuit 303 and a RX control circuit 304. The TX control circuit 204 is coupled between the TX communication circuit 203, the voltage conversion circuit 201 and the power supply 10. The RX control circuit 304 is coupled between the RX communication circuit 303 and the rectifier circuit 302. The wireless communication between the TX communication circuit 203 and the RX communication circuit 303 may be achieved through Bluetooth, wireless-fidelity (WiFi), Zigbee, radio frequency identification (RFID), long range (Lora) wireless technology, and near field communication (NFC) and the like. The TX control circuit 204 and the RX control circuit 304 are mainly configured for data processing and transmission control.

In practical applications, the transmitter 20 may be located in a charger. The receiver 30 may be embedded into an electronic device. When the electronic device is placed close to the charger, that is, the receiver 30 is placed close to the transmitter 20. The transmitter 20 and the receiver 30 first establish a communication connection and complete a transmission configuration, after which the transmitter 20 is magnetically coupled to the receiver 30 via a magnetic field, such that the power from the power supply 10 can be wirelessly transmitted to the load 40.

Figure 3:
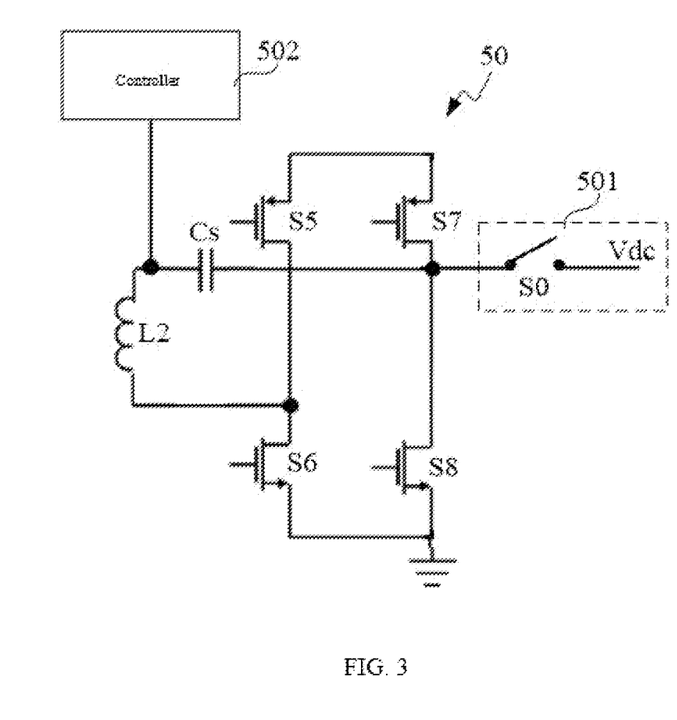
FIG. 3 shows one circuit diagram of a foreign object detection circuit.
Figure 5:
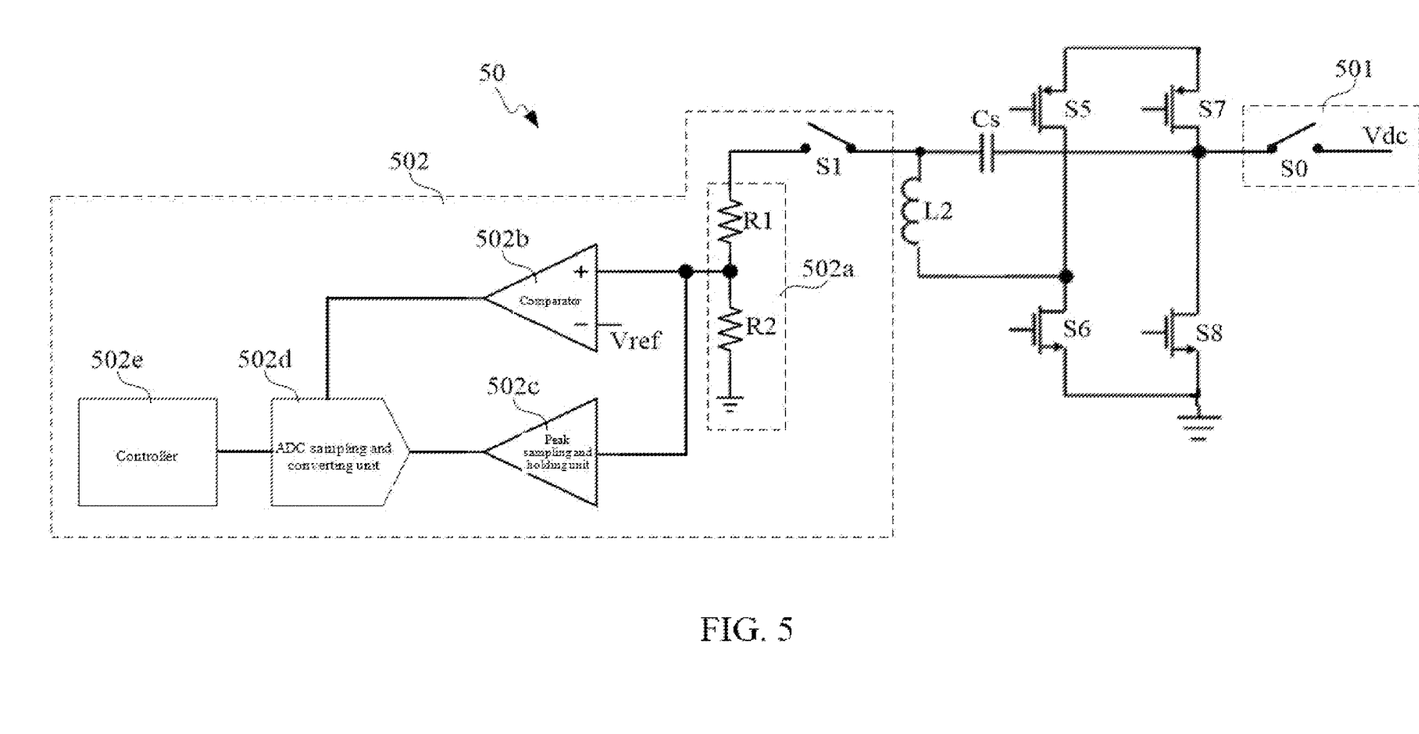
FIG. 5 shows another circuit diagram of a foreign object detection circuit.

To achieve foreign object detection, as shown in FIG. 3 and FIG. 5, the embodiment provides a foreign object detection circuit 50 arranged in a receiver of a wireless power transmission system. The foreign object detection circuit 50 comprises an excitation injection module 501, a foreign object detection module 502, and a resonance circuit coupled to the receiver 30 in the wireless power transmission system, i.e., a RX resonance circuit 301. The RX resonance circuit 301 comprises a receiving coil L2 and a resonant capacitor Cs connected in series. The excitation injection module 501 is configured to apply an excitation with a voltage step to the RX resonance circuit 301 and to enable the RX resonance circuit 301 to generate a self-excited oscillation. The foreign object detection module 502 is configured to measure a quality factor Q of a receiver 30 terminal based on the self-excited oscillation of the RX resonance circuit 301, and determine whether a foreign object exists in the wireless power transmission system or not based on the quality factor Q. Further, the foreign object detection module 502 is further configured to perform a foreign object detection time control and perform transmission control according to whether the foreign object exists or not.

In an example, as shown in FIG. 3, the excitation injection module 501 comprises a switch S0 and a DC power supply. The DC power supply is coupled to the RX resonance circuit 301 via the switch S0. The foreign object detection module 502 is implemented using a controller. In addition to being used in foreign object detection, the controller is further used to configure the switch S0 and the switches S5-S8 in the rectifier circuit 302. Alternatively, to simplify the system composition, the function of the controller may be implemented by the RX control circuit 304.

Further, the controller is also configured to control the foreign object detection time, i.e., to control the foreign object detection to be performed before or during power transmission. Specifically, the control is implemented by sending an instruction to the TX control circuit 204 by the controller so as to control the power supply 10 and/or the voltage conversion circuit 201.

The controller is also configured to perform the transmission control according to whether the foreign object exists or not, specifically as follows: when the foreign object detection is performed before the power transmission, in a case that the controller determines that no foreign object exists in the wireless power transmission system, an instruction is sent to the TX control circuit 204 to control the power supply 10 and the voltage conversion circuit 201 to enable the wireless power transmission. In a case that the controller determines that the foreign object exists in the wireless power transmission, an instruction is sent to the TX control circuit 204 to control the power supply 10 and the voltage conversion circuit 201 to disable, or limit, the wireless power transmission. When the foreign object detection is performed during power transmission, in a case that the controller determines that no foreign object exists in the wireless power transmission system, an instruction is sent to the TX control circuit 204 to control the power supply 10 and the voltage conversion circuit 201 to continue the wireless power transmission. In a case that the controller determines that the foreign object exists in the wireless power transmission, an instruction is sent to the TX control circuit 204 to control the power supply 10 and the voltage conversion circuit 201 to stop or limit the wireless power transmission.

During a specific application, the excitation with a voltage step is applied to the RX resonance circuit 301 via two steps: in step one, the switch S0 is switched on, and a DC voltage Vdc provided by the DC power supply is applied to the RX resonance circuit 301. In response to the DC voltage Vdc, a current flows from the DC power supply to the ground via the resonant capacitor Cs, the receiving coil L2 and the switch S6. In step two, the switch S0 is switched off, and two terminals of the RX resonance circuit 301 are grounded via the switches S6 and S8. The current flows in a conductive loop formed by the switch S8, the resonant capacitor Cs, the receiving coil L2 and the switch S6. By switching the switch S0 on and off, the voltage step (from Vdc to 0) is applied to the RX resonance circuit 301. In response to the voltage step, a damped sinusoidal waveform with a resonant attenuation envelope is generated in the RX resonance circuit 301 (as shown in FIG. 4).

The controller is configured to detect the damped sinusoidal waveform, and detect the last moment at which a value of the damped sinusoidal waveform is equal to a threshold voltage so as to determine the moment corresponding to the peak of the damped sinusoidal waveform according to the last moment. The moment corresponding to the peak and the last moment are located in the same cycle of the damped sinusoidal waveform. The controller is configured to determine the peak of the damped sinusoidal waveform according to the last moment, the moment corresponding to the peak and the threshold voltage, and calculate the quality factor Q according to the moment corresponding to the peak and a ratio of a voltage value of the voltage step to the peak, thereby determining whether a foreign object exists in the wireless power transmission system or not.

Figure 4:
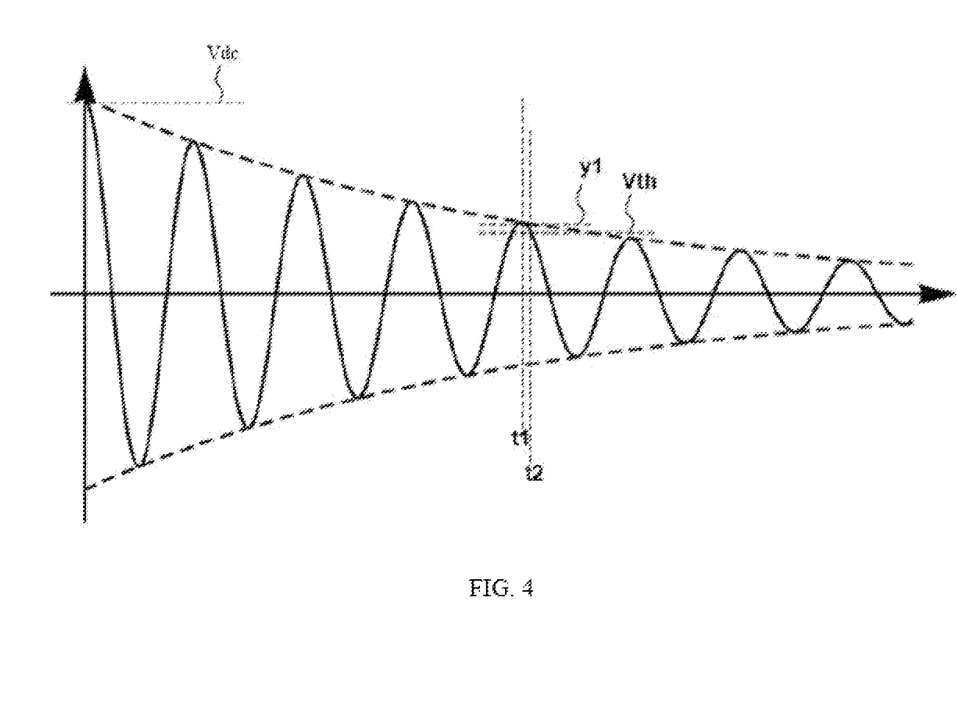
FIG. 4 shows an oscillogram of a damped sinusoidal waveform.

A specific calculation method for the quality factor Q is as follows: as shown in FIG. 4, t2 is the last moment at which a value of the damped sinusoidal waveform is equal to a threshold voltage Vth. t1 is the moment corresponding to the peak of the damped sinusoidal waveform, and t1 and t2 are located in the same cycle of the damped sinusoidal waveform. The moment t1 may be expressed as:

$$t1 = N \times T \qquad (1)$$

In Equation (1), T is the cycle of the damped sinusoidal waveform. N is the number of oscillation cycles, and N is equal to 4 in this example. The peak y1 may also be expressed as:

$$Vth = y1 \times \sin\left(\frac{\frac{T}{4} - (t2 - t1)}{\frac{T}{4}} \times \frac{\pi}{2}\right) \qquad (2)$$

According to the damped sinusoidal waveform, the peak y1 may also be expressed as:

$$y1 = Vdc \times e^{-\frac{t1}{\tau}} \qquad (3)$$

In Equation (3), Vdc is a DC voltage provided by the DC power supply, and τ is a time constant of the damped sinusoidal waveform. Equation (3) may be simplified as:

$$e^{\frac{t1}{\tau}} = Vdc/y1 \qquad (4)$$

Equation (4) may be further expressed as:

$$\frac{t1}{\tau} = \ln\left(\frac{Vdc}{y1}\right) \qquad (5)$$

According to the definition of the time constant, τ may be expressed as:

$$\tau = \frac{2 \times L}{R} \qquad (6)$$

In Equation (6), L is an equivalent inductance of the RX resonance circuit. R is an equivalent resistance of the RX resonance circuit. Equation (6) can be substituted into Equation (5), the following equation can be obtained:

$$\frac{L}{R} = \frac{t1}{2 \times \ln\left(\frac{Vdc}{y1}\right)} \qquad (7)$$

A quality factor Q of the RX resonance circuit may be expressed as:

$$Q = \frac{L}{R} \times 2\pi f \qquad (8)$$

In Equation (8), f is a frequency of the damped sinusoidal waveform. Equation (7) can be substituted into Equation (8), the following equation can be obtained:

$$Q = \frac{t1}{2 \times \ln\left(\frac{Vdc}{y1}\right)} \times 2\pi f \qquad (9)$$

In another example, as shown in FIG. 5, the excitation injection module 501 comprises a switch S0 and a DC power supply. The DC power supply is coupled to the RX resonance circuit 301 via the switch S0. The foreign object detection module 502 comprises a switch S1, a voltage sampling unit 502a, a comparator 502b, a peak sampling and holding unit 502c, an ADC sampling and converting unit 502d, and a controller 502e. The voltage sampling unit 502a is coupled to the RX resonance circuit 301 via the switch S1. One input terminal of the comparator 502b is coupled to an output terminal of the voltage sampling unit 502a, and the other input terminal of the comparator 502b is coupled to a reference voltage Vref. An output terminal of the comparator 502b is coupled to an input terminal of the ADC sampling and converting unit 502d. An input terminal of the peak sampling and holding unit 502c is coupled to the output terminal of the voltage sampling unit 502a. An output terminal of the peak sampling and holding unit 502c is coupled to the other input terminal of the ADC sampling and converting unit 502d. An output terminal of the ADC sampling and converting unit 502d is coupled to the controller 502e. The controller, in addition to being used in the foreign object detection, may also be used to configure the switches S0 and S1 and switches S5 to S8 in the rectifier circuit 302. Specifically, the voltage sampling unit 502a is implemented in a resistance voltage division manner. Alternatively, to simplify system composition, the function of the controller 502e may be implemented by the RX control circuit 304.

Furthermore, the controller 502e is also configured to control the foreign object detection time, i.e., to control the foreign object detection to be performed before or during power transmission. Specifically, the control is achieved by sending an instruction to the TX control circuit 204 by the controller so as to control the power supply 10 and/or the voltage conversion circuit 201.

The controller 502e is also configured to perform the transmission control according to whether the foreign object exists or not, specifically as follows: when the foreign object detection is performed before power transmission, in a case that the controller 502e determines that no foreign object exists in the wireless power transmission system, an instruction is sent to the TX control circuit 204 to control the power supply 10 and the voltage conversion circuit 201 to enable the wireless power transmission. In a case that the controller determines that the foreign object exists in the wireless power transmission, an instruction is sent to the TX control circuit 204 to control the power supply 10 and the voltage conversion circuit 201 to disable, or limit, the wireless power transmission. When the foreign object detection is performed during power transmission, in a case that the controller 502e determines that no foreign object exists in the wireless power transmission system, an instruction is sent to the TX control circuit 204 to control the power supply 10 and the voltage conversion circuit 201 to continue the wireless power transmission. In a case that the controller determines that the foreign object exists in the wireless power transmission, an instruction is sent to the TX control circuit 204 to control the power supply 10 and the voltage conversion circuit 201 to stop or limit the wireless power transmission.

During a specific application, in step one, the switch S0 is switched on and a switch S1 is switched off. A DC voltage Vdc provided by the DC power supply is applied to the RX resonance circuit 301, and in response to the DC voltage Vdc, a current flows from the DC power supply to the ground via the resonant capacitor Cs, the receiving coil L2 and the switch S6. In step two, the switch S0 is switched off and the switch S1 is switched on. Two terminals of the RX resonance circuit 301 are grounded via the switches S6 and S8, and the current flows in a conductive loop formed by the switch S8, the resonant capacitor Cs, the receiving coil L2 and the switch S6. By switching the switch S0 on and off, a voltage step (from Vdc to 0) is applied to the RX resonance circuit 301. In response to the voltage step, the RX resonance circuit 301 generates a self-excited oscillation.

Meanwhile, the voltage sampling unit 502a is configured to sample a capacitive voltage of the resonant capacitor Cs using resistance subdivision so as to obtain a sampling voltage signal. The comparator 502b is configured to convert the sampling voltage signal into a square signal based on the reference voltage Vref. The peak sampling and holding unit 502c is configured to perform peak holding on the sampled voltage signal synchronously so as to output a peak voltage signal. The ADC sampling and converting unit 502d is configured to perform an analog-to-digital conversion on the peak voltage signal and the square signal, and perform sampling synchronously so as to obtain a peak voltage of each wave crest and a corresponding cycle number thereof. The controller 502e is configured to calculate the quality factor Q according to the peak voltage of each wave crest and the corresponding cycle number thereof, thus determining whether a foreign object exists in the wireless power transmission system or not based on the quality factor.

A specific calculation method for the quality factor Q is as follows: the self-excited oscillation generated by the RX resonance circuit 301 is equivalent to that a step signal is injected thereto. The following can be obtained according to the series resonance step response formula:

$$V(p2) = Vp(1)e^{-\frac{w(t2-t1)}{2Q}} = Vp(1)e^{-\frac{wT}{2Q}} = Vp(1)e^{-\frac{\pi}{Q}} \quad (10)$$

$$w = 2\pi f = \frac{2\pi}{\tau} \quad (11)$$

Equation (10) is subjected to an operational transformation. A quality factor Q can be calculated according to the peak voltage of each wave crest and the corresponding cycle thereof. The quality factor Q can be expressed as:

$$Q = \frac{\pi}{\ln\left(\frac{Vp(1)}{Vp(2)}\right)} \quad (12)$$

In Equation (12), Vp (1) and Vp (2) are the peak voltages of any two adjacent wave crests. Certainly, Equation (12) above may also be deformed as:

$$Q = \frac{N\pi}{\ln\left(\frac{Vp(1)}{Vp(2)}\right)} \quad (13)$$

In Equation (13), Vp (1) and Vp (2) are the peak voltages of any two crests with the interval time being N oscillation cycles.

Figure 6:
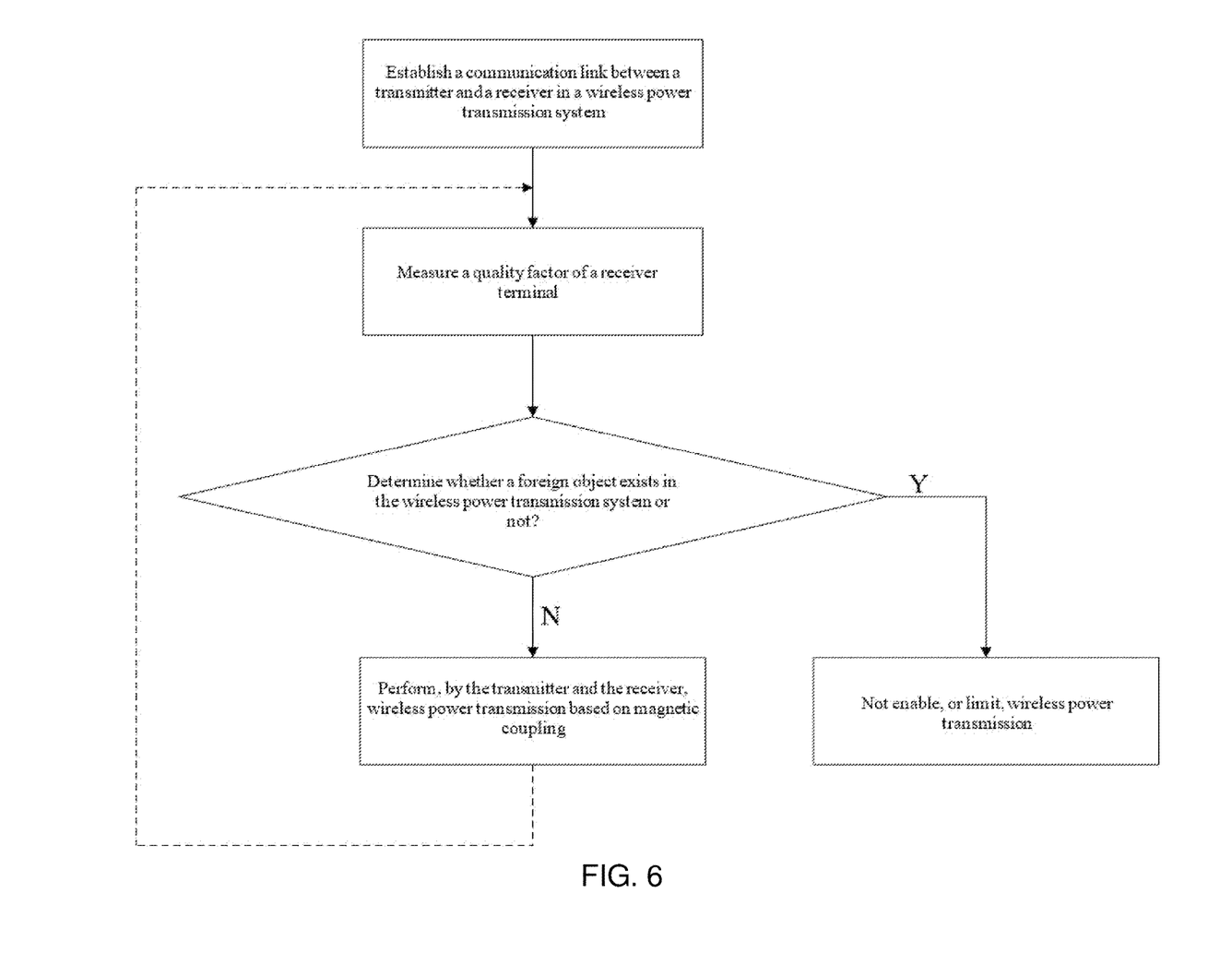
FIG. 6 shows a flow chart of a foreign object detection method.
Figure 7:
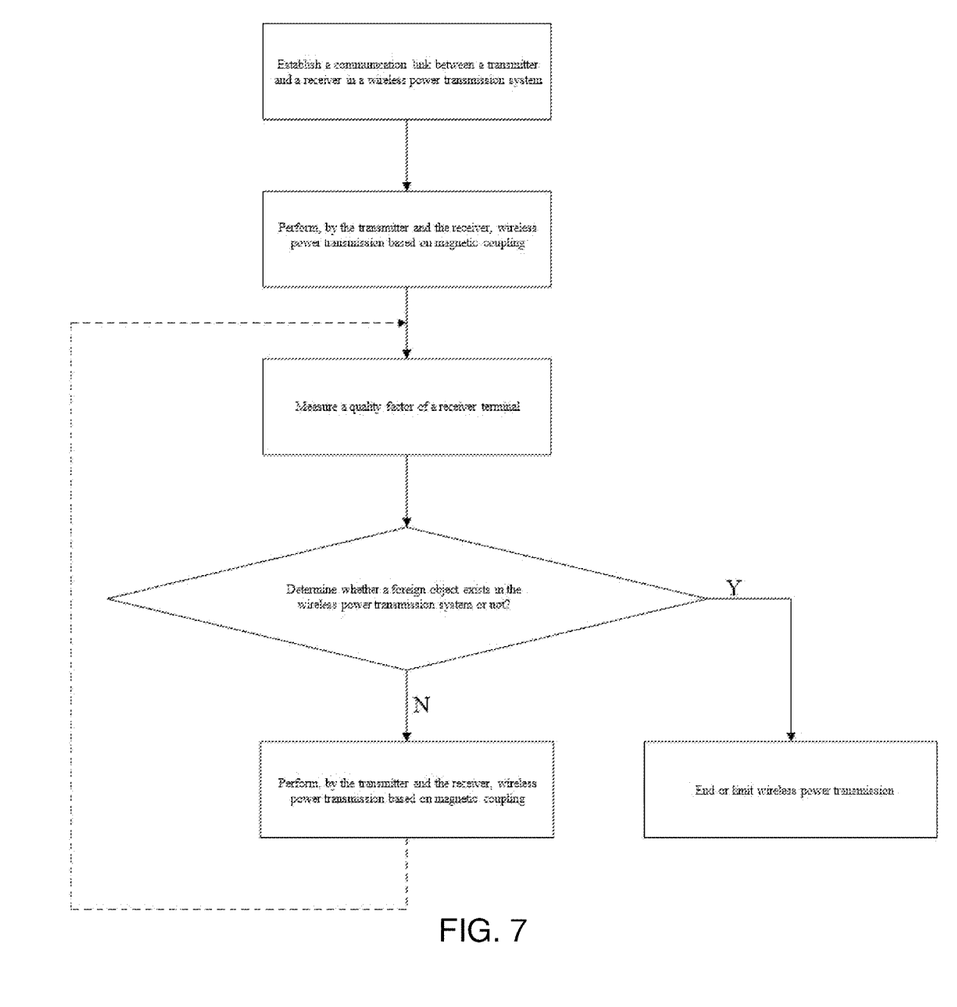
FIG. 7 shows another flow chart of a foreign object detection method.

As shown in FIG. 6 and FIG. 7, the embodiment provides a foreign object detection method used in a wireless power transmission system. The foreign object detection method comprises: step a) establishing a communication link between a transmitter and a receiver in a wireless power transmission system; step b) performing, by the transmitter and the receiver, wireless power transmission based on magnetic coupling; and step c) measuring a quality factor of a receiver terminal, and determining whether a foreign object exists in the wireless power transmission system or not based on the quality factor.

The step c) may be performed before the step b), i.e., the foreign object detection is performed before the power transmission. At this moment, various steps are sequentially performed as follows: step a), step c), and step b) (as shown in FIG. 6, a loop shown by the dotted line therein should be ignored). Certainly, the step c) may also be performed after the step b), i.e., the foreign object detection is performed during the power transmission. At this moment, various steps are sequentially performed as follows: step a), step b), and step c) (as shown in FIG. 7). Certainly, the step c) may also be performed both before step b) and after step b), i.e., the foreign object detection is performed both before and during the power transmission. At this moment, various steps are sequentially performed as follows: step a), step c), step b, and step c) (as shown in FIG. 6).

Alternatively, when the step c) is performed before the step b), the step c) further comprises: in a case of determining that no foreign object exists in the wireless power transmission system, enabling the wireless power transmission; and in a case of determining that the foreign object exists in the wireless power transmission system, not enabling, or limiting the wireless power transmission (as shown in FIG. 6). The wireless power transmission is limited by limiting the transmission power. Alternatively, when the step c) is performed after the step b), the step c) further comprises: in a case of determining that no foreign object exists in the wireless power transmission system, continuing the wireless power transmission; and in a case of determining that the foreign object exists in the wireless power transmission system, ending or limiting the wireless power transmission (as shown in FIG. 7). The wireless power transmission is limited by limiting the transmission power. Furthermore, whether the step c is performed before or after the step b), when determining that there is a foreign object existing in the wireless power transmission system, the step c) may also comprise giving an alarm to remind a user.

In the step a), the transmitter is configured to wake up the receiver by sending a wake-up command (e.g., a ping command) to the receiver and to establish a communication link with the receiver. Furthermore, after the receiver is waken up, the receiver may configure related power transmission parameters for the transmitter, such as transmission power.

In the step c), a method for measuring a quality factor of a receiver terminal comprises: applying an excitation with a voltage step to a resonance circuit formed by a receiving coil and a resonant capacitor in the receiver, and enabling the resonance circuit to generate a self-excited oscillation so as to obtain a damped sinusoidal waveform with a resonance attenuation envelope; comparing the damped sinusoidal waveform with a threshold voltage, and detecting the last moment at which a value of the damped sinusoidal waveform is equal to the threshold voltage; determining the moment corresponding to the peak of the damped sinusoidal waveform according to the last moment, wherein the moment corresponding to the peak and the last moment are located in the same cycle of the damped sinusoidal waveform; determining the peak of the damped sinusoidal waveform according to the last moment, the moment corresponding to the peak and the threshold voltage; and calculating the quality factor according to the moment corresponding to the peak value and a ratio of a voltage value of the voltage step to the peak value. Certainly, in the step c), there is another method for measuring a quality factor of a receiver terminal, which comprises: applying an excitation with a voltage step to a resonance circuit formed by a receiving coil and a resonant capacitor in the receiver, and enabling the resonance circuit to generate a self-excited oscillation; sampling a capacitor voltage in the resonance circuit to obtain a sampling voltage signal; performing peak holding on the sampling voltage signal so as to output a peak voltage signal, and converting the sampling voltage signal into a square signal synchronously; performing an analog-to-digital conversion and sampling synchronously on the peak voltage signal and the square signal to obtain a peak voltage of each wave crest and a corresponding cycle number thereof; and calculating the quality factor according to a peak voltage of each wave crest and a corresponding cycle number thereof. It needs to be noted that, as these two processes of calculating the quality factor Q have been described in detail above, unnecessary details will not be given herein.

In the step c), a method for determining whether a foreign object exists in the wireless power transmission system or not based on the quality factor comprises: comparing the quality factor with a set value; determining that the foreign object exists in the wireless power transmission system when the quality factor is smaller than the set value; and determining that no foreign object exists in the wireless power transmission system when the quality factor is greater than the set value.

Furthermore, a method for obtaining the set value comprises: when no foreign object exists, measuring the quality factors of the receiver terminal under different center distances, and selecting the minimum value as a set quality factor; using a product of the set quality factor and a set percent as the set value, where the center distance refers to a distance between the center of a transmitting coil of the transmitter and the center of a receiving coil of the receiver. It needs to be noted that, for the same devices (i.e., the coils of the transmitters are the same, and the coils of the receivers are the same), due to the same change trend of the quality factors, the quality factors of the receiver terminal under different center distances can be measured only for a certain number (such as 30) of devices, and the center distance corresponding to the minimum quality factor can be found out therefrom; and then, only the quality factors of the receiver terminals corresponding to other devices under the center distance need to be measured to serve as the set quality factors. Furthermore, a plurality of sets of measurements are repeated to obtain a plurality of the minimum values, and the plurality of the minimum values are averaged to obtain the set quality factor. Alternatively, the set percent is not greater than 100%. For example, the set percent is 80%. Certainly, the set percent may be set to be 85%, 75% and the like according to specific demands.

Figure 8:
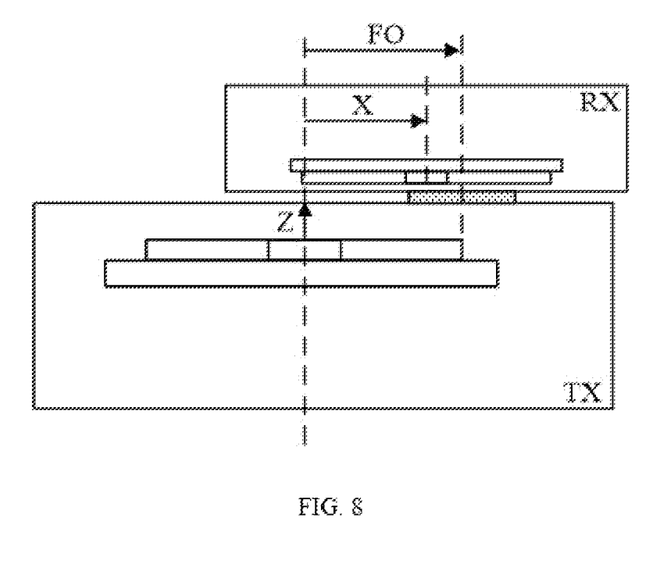
FIG. 8 shows a schematic diagram when a foreign object exists between a transmitter and a receiver.

The following will describe the foreign object detection device and method in accordance with the embodiment based on actually measured data with reference to FIG. 8, where an X distance refers to a horizontal distance between the center of a transmitting coil of the transmitter and the center of a receiving coil of a receiver. A Z distance refers to a vertical distance between the center of the transmitting coil of the transmitter and the surface of the transmitter, and FO refers to a horizontal distance between the center of the transmitting coil of the transmitter and the center of the foreign object.

The foreign object being an aluminum ring is taken as an example. The X distance and the FO distance are adjusted. The measured data of the quality factor Qp of a transmitter terminal and the quality factor Qs of a receiver terminal are as shown in Table 1, where 80% of the minimum Qp and Qs measured when no foreign object exists are used as set values. The set value of the transmitter terminal is 74.3107×80%=59.44856, and the set value of the receiver terminal is 26.074×80%=20.8592.

As can be seen from Table 1, when Qp is used for foreign object detection, there is a large detection error, such that the foreign objects under some conditions cannot be detected (those marked with * in Table 1 are that the foreign objects cannot be detected). Therefore, compared with Qp, when the foreign object detection is performed by means of Qs, the detection error is greatly reduced, and the detection accuracy is greatly improved. The possible reason is that the coil of the receiving terminal is closer to the foreign object than the coil of a transmitting terminal.

TABLE 1

| FO distance (mm) | Freq (KHz) | Z distance (mm) | X distance (mm) | Qp | Qs |
|---|---|---|---|---|---|
| No foreign object | 100 | 5 | 0 | 74.3107 | 26.6196 |
|  | 100 | 5 | 5 | 77.70143 | 26.29894 |
|  | 100 | 5 | 7.5 | 80.45381 | 26.27083 |
|  | 100 | 5 | 10 | 83.04732 | 26.074 |
| 0 | 100 | 5 | 0 | 42.43138 | 12.06746 |
|  | 100 | 5 | 5 | 47.27986 | 14.5955 |
|  | 100 | 5 | 7.5 | 50.60123 | 17.33292 |
|  | 100 | 5 | 10 | 51.78719 | 18.70535 |
| 7.5 | 100 | 5 | 0 | 84.60782* | 13.81616 |
|  | 100 | 5 | 5 | 50.49648 | 11.42123 |
|  | 100 | 5 | 7.5 | 55.47593 | 12.28221 |
|  | 100 | 5 | 10 | 56.70575 | 12.75822 |
| 15 | 100 | 5 | 0 | 70.67087* | 19.07691 |
|  | 100 | 5 | 5 | 69.11504* | 14.60752 |
|  | 100 | 5 | 7.5 | 71.08623* | 12.84453 |
|  | 100 | 5 | 10 | 71.89777* | 11.74817 |

As above, a foreign object detection circuit and a foreign object detection method provided by the present invention may be performed before and/or during power transmission. The foreign object detection is performed by using the quality factor of the receiver terminal. The detection error is greatly reduced, and the detection precision is improved. Therefore, various shortcomings in the prior art are effectively overcome, and high industrial utilization value is achieved.

The above embodiments are merely illustrative of the principles of the present invention and their efficacy, and are not intended to limit the present invention. Any person skilled in the art can make modifications or changes to the embodiments above without departing from the spirit and scope of the present invention. Therefore, all equivalent modifications or changes made by those skilled in the art without departing from the spirit and technical idea disclosed herein should still be covered by the claims of the present invention.

What is claimed is:

1. A foreign object detection method applied to a wireless power transmission system, comprising:

step a) establishing a communication link between a transmitter and a receiver in the wireless power transmission system;

step b) performing, by the transmitter and the receiver, a wireless power transmission based on a magnetic coupling; and step c) measuring a quality factor of a receiver terminal, and determining whether a foreign object exists in the wireless power transmission system or not based on the quality factor, wherein measuring the quality factor of the receiver terminal comprises:

applying an excitation with a voltage step to a resonance circuit formed by a receiving coil and a resonant capacitor in the receiver, and enabling the resonance circuit to generate a self-excited oscillation;

sampling a capacitor voltage in the resonance circuit to obtain a sampling voltage signal;

performing a peak holding on the sampling voltage signal so as to output a peak voltage signal, and converting the sampling voltage signal into a square signal synchronously;

performing an analog-to-digital conversion and sampling synchronously on the peak voltage signal and the square signal to obtain a peak voltage of each wave crest and a corresponding cycle number thereof; and calculating the quality factor according to the peak voltage of each wave crest and the corresponding cycle number thereof.

2. The foreign object detection method according to claim 1, wherein the step c) is performed before or after the step b).

3. The foreign object detection method according to claim 2, wherein when the step c) is performed before the step b), the step c) further comprises:

in a case of determining that no foreign object exists in the wireless power transmission system, enabling the wireless power transmission; and in a case of determining that the foreign object exists in the wireless power transmission system, disabling, or limiting the wireless power transmission.

4. The foreign object detection method according to claim 2, wherein when the step c) is performed after the step b), the step c) further comprises:

in a case of determining that no foreign object exists in the wireless power transmission system, continuing the wireless power transmission; and in a case of determining that the foreign object exists in the wireless power transmission system, ending, or limiting, the wireless power transmission.

5. The foreign object detection method according to claim 4, wherein the wireless power transmission is limited by limiting transmission power.

6. The foreign object detection method according to claim 1, wherein a method for determining whether the foreign object exists in the wireless power transmission system or not based on the quality factor comprises:

comparing the quality factor with a set value;

determining that the foreign object exists in the wireless power transmission system when the quality factor is smaller than the set value; and determining that no foreign object exists in the wireless power transmission system when the quality factor is greater than the set value.

7. The foreign object detection method according to claim 6, wherein a method for obtaining the set value comprises:

when no foreign object exists, measuring quality factors of the receiver terminal under different center distances, and selecting a minimum value as a set quality factor; and using a product of the set quality factor and a set percent as the set value, and wherein a center distance refers to a distance between a center of a transmitting coil of the transmitter and a center of a receiving coil of the receiver.

8. The foreign object detection method according to claim 7, wherein a plurality of sets of measurements are repeated to obtain a plurality of minimum values, and the plurality of minimum values are averaged to obtain the set quality factor.

9. The foreign object detection method according to claim 7, wherein the set percent is not greater than 100%.

10. A foreign object detection circuit arranged in a receiver of a wireless power transmission system, wherein the foreign object detection circuit comprises an excitation injection module and a foreign object detection module, as well as a resonance circuit coupled to the receiver in the wireless power transmission system, the resonance circuit comprising a receiving coil and a resonant capacitor connected in series, and wherein:

the excitation injection module is configured to apply an excitation with a voltage step to the resonance circuit, and enable the resonance circuit to generate a self-excited oscillation; and the foreign object detection module is configured to measure a quality factor of a receiver terminal based on the self-excited oscillation of the resonance circuit, and determine whether a foreign object exists in the wireless power transmission system or not based on the quality factor, and wherein measuring the quality factor of the receiver terminal comprises:

applying an excitation with a voltage step to a resonance circuit formed by a receiving coil and a resonant capacitor in the receiver, and enabling the resonance circuit to generate a self-excited oscillation;

sampling a capacitor voltage in the resonance circuit to obtain a sampling voltage signal;

performing a peak holding on the sampling voltage signal so as to output a peak voltage signal, and converting the sampling voltage signal into a square signal synchronously;

performing an analog-to-digital conversion and sampling synchronously on the peak voltage signal and the square signal to obtain a peak voltage of each wave crest and a corresponding cycle number thereof; and calculating the quality factor according to the peak voltage of each wave crest and the corresponding cycle number thereof.

11. The foreign object detection circuit according to claim 10, wherein the foreign object detection module is further configured to perform foreign object detection time control, and to perform transmission control according to whether the foreign object exists or not.

12. A foreign object detection method applied to a wireless power transmission system, comprising:

step a) establishing a communication link between a transmitter and a receiver in the wireless power transmission system;

step b) performing, by the transmitter and the receiver, a wireless power transmission based on a magnetic coupling; and step c) measuring a quality factor of a receiver terminal, and determining whether a foreign object exists in the wireless power transmission system or not based on the quality factor, wherein measuring the quality factor of the receiver terminal comprises:

applying an excitation with a voltage step to a resonance circuit formed by a receiving coil and a resonant capacitor in the receiver, and enabling the resonance circuit to generate a self-excited oscillation so as to obtain a damped sinusoidal waveform with a resonance attenuation envelope;

comparing the damped sinusoidal waveform with a threshold voltage, and detecting a last moment at which a value of the damped sinusoidal waveform is equal to the threshold voltage;

determining a moment corresponding to a peak value of the damped sinusoidal waveform according to the last moment, wherein the moment corresponding to the peak value and the last moment are located in a same cycle of the damped sinusoidal waveform;

determining the peak value of the damped sinusoidal waveform according to the last moment, the moment corresponding to the peak value and the threshold voltage; and calculating the quality factor according to the moment corresponding to the peak value and a ratio of a voltage value of the voltage step to the peak value.

13. The foreign object detection method according to claim 12, wherein the step c) is performed before or after the step b).

14. The foreign object detection method according to claim 13, wherein when the step c) is performed before the step b), the step c) further comprises:

in a case of determining that no foreign object exists in the wireless power transmission system, enabling the wireless power transmission; and in a case of determining that the foreign object exists in the wireless power transmission system, disabling, or limiting the wireless power transmission.

15. The foreign object detection method according to claim 13, wherein when the step c) is performed after the step b), the step c) further comprises:

in a case of determining that no foreign object exists in the wireless power transmission system, continuing the wireless power transmission; and in a case of determining that the foreign object exists in the wireless power transmission system, ending, or limiting, the wireless power transmission.

16. The foreign object detection method according to claim 15, wherein the wireless power transmission is limited by limiting transmission power.

17. The foreign object detection method according to claim 12, wherein a method for determining whether the foreign object exists in the wireless power transmission system or not based on the quality factor comprises:

comparing the quality factor with a set value;

determining that the foreign object exists in the wireless power transmission system when the quality factor is smaller than the set value; and determining that no foreign object exists in the wireless power transmission system when the quality factor is greater than the set value.

18. The foreign object detection method according to claim 17, wherein a method for obtaining the set value comprises:

when no foreign object exists, measuring quality factors of the receiver terminal under different center distances, and selecting a minimum value as a set quality factor; and using a product of the set quality factor and a set percent as the set value, and wherein a center distance refers to a distance between a center of a transmitting coil of the transmitter and a center of a receiving coil of the receiver.

19. The foreign object detection method according to claim 18, wherein a plurality of sets of measurements are repeated to obtain a plurality of minimum values, and the plurality of minimum values are averaged to obtain the set quality factor.

20. The foreign object detection method according to claim 18, wherein the set percent is not greater than 100%.

* * * * *